US012448920B2

(12) United States Patent
Brouillet et al.

(10) Patent No.: US 12,448,920 B2
(45) Date of Patent: Oct. 21, 2025

(54) OIL DE-AERATOR FOR AIRCRAFT ENGINE (71) Applicant: PRATT & WHITNEY CANADA CORP., Longueuil (CA)

(72) Inventors: Audrey Brouillet, Saint-Basile-le-Grand (CA); Daniel Alecu, Brampton (CA); Felix Gauthier, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 47 days.

(21) Appl. No.: 18/491,248

(22) Filed: Oct. 20, 2023

(65) Prior Publication Data
US 2025/0129746 A1    Apr. 24, 2025

(51) Int. Cl.
*F02C 7/06* (2006.01)
*B01D 19/00* (2006.01)
*B64D 27/10* (2006.01)

(52) U.S. Cl.
CPC ............ *F02C 7/06* (2013.01); *B01D 19/0042* (2013.01); *B64D 27/10* (2013.01); *F05D 2260/98* (2013.01)

(58) Field of Classification Search
CPC ................................ F02C 7/06; F16N 39/002
See application file for complete search history.

(56) References Cited

U.S. PATENT DOCUMENTS

| 2,034,914 | A | * | 3/1936 | Lanser | ............... | B01D 19/0057 |
|   |   |   |   |   |   | 96/174 |
| 4,053,291 | A | * | 10/1977 | Sims | .................. | B01D 19/0057 |
|   |   |   |   |   |   | 210/512.1 |
| 7,063,734 | B2 | * | 6/2006 | Latulipe | .................. | F01D 25/18 |
|   |   |   |   |   |   | 55/428 |
| 8,292,034 | B2 | * | 10/2012 | Mount | .................... | F01D 25/18 |
|   |   |   |   |   |   | 60/39.08 |

(Continued)

FOREIGN PATENT DOCUMENTS

| CA | 2861179 A1 | 6/2015 |
| CA | 2990903 A1 | 7/2018 |

(Continued)

OTHER PUBLICATIONS

European Search Report issued Mar. 19, 2025 in counterpart EP application No. 24207633.9.

*Primary Examiner* — Michael A Riegelman
(74) *Attorney, Agent, or Firm* — NORTON ROSE FULBRIGHT CANADA LLP (57) ABSTRACT

An aircraft engine, has: an oil circuit fluidly connecting an oil reservoir to components of the aircraft engine; and a de-aerator fluidly connected to the oil circuit and located downstream of the components relative to a flow of the oil through the oil circuit, the de-aerator feeding the flow of the oil into the reservoir, the de-aerator having: a nozzle extending from a nozzle inlet to a nozzle outlet along a flow passage delimited by a peripheral wall, the peripheral wall extending around a central axis of the nozzle, a flow (Continued)

circulating area of the flow passage decreasing from the nozzle inlet to the nozzle outlet; and a deflector projecting from the peripheral wall of the nozzle at the nozzle outlet, the deflector having a curved section extending between a proximal end at the nozzle outlet and a distal end, the deflector intersected by the central axis of the nozzle.

20 Claims, 4 Drawing Sheets

(56) References Cited

U.S. PATENT DOCUMENTS

| | | | | |
|---|---|---|---|---|
| 8,443,843 B2* | 5/2013 | Mount | .................... | F01D 25/18 138/90 |
| 9,464,572 B2* | 10/2016 | Cutrara | .................... | F02C 7/06 |
| 9,650,957 B2* | 5/2017 | Cutrara | .................... | F01M 1/00 |
| 9,976,490 B2* | 5/2018 | Sheridan | ............... | F16N 39/002 |
| 10,507,410 B2* | 12/2019 | Czajkowski | ....... | B01D 19/0052 |
| 10,508,571 B2* | 12/2019 | Blundy | ................. | F01M 11/04 |
| 11,541,340 B2* | 1/2023 | Stone | .................... | B01D 45/16 |
| 11,692,669 B2* | 7/2023 | Schetzel | .................. | F02C 7/06 95/261 |
| 11,867,357 B1* | 1/2024 | Sidorovich Paradiso | ................... | B01D 19/0052 |
| 2015/0176492 A1* | 6/2015 | Cutrara | .................... | F01M 1/00 184/106 |
| 2016/0017812 A1* | 1/2016 | Sheridan | .................... | F02C 7/36 415/1 |
| 2016/0305323 A1* | 10/2016 | Cutrara | .................... | F01M 1/00 |
| 2018/0193770 A1* | 7/2018 | Czajkowski | ....... | B01D 19/0047 |
| 2018/0238242 A1 | 8/2018 | Sheridan | | |
| 2022/0233973 A1* | 7/2022 | Caron | .................... | F01D 25/20 |
| 2024/0082755 A1* | 3/2024 | Sidorovich Paradiso | ................... | B01D 19/0052 |
| 2025/0129746 A1* | 4/2025 | Brouillet | .................... | F02C 7/06 |

FOREIGN PATENT DOCUMENTS

| | | |
|---|---|---|
| DE | 102015116022 A1 | 3/2017 |
| JP | 2000249431 A | 9/2000 |

* cited by examiner

FIG_4

FIG. 5

OIL DE-AERATOR FOR AIRCRAFT ENGINE

TECHNICAL FIELD

The disclosure relates generally to oil systems of aircraft engines and, more particularly, to systems and methods used to separate air from oil in such oil systems.

BACKGROUND

Aircraft engines, such as gas turbine engines, include an oil system for distributing a oil to required portions of the engine for lubrication and/or cooling purposes. For example, oil may be directed to and from a bearing cavity of the aircraft engine. However, during operation of the aircraft engine, air may become mixed with the oil as it is scavenged and returned to an oil tank. De-aerator and other systems may be used to extract the air from an air-oil mixture. Although existing de-aerators may be satisfactory for their intended purposes, improvements are always sought.

SUMMARY

In one aspect, there is provided an aircraft engine, comprising: an oil circuit fluidly connecting a reservoir of oil to components of the aircraft engine; and a de-aerator fluidly connected to the oil circuit and located downstream of the components relative to a flow of the oil through the oil circuit, the de-aerator feeding the flow of the oil into the reservoir, the de-aerator having: a nozzle extending from a nozzle inlet to a nozzle outlet along a flow passage delimited by a peripheral wall, the peripheral wall extending around a central axis of the nozzle, a flow circulating area of the flow passage decreasing from the nozzle inlet to the nozzle outlet; and a deflector projecting from the peripheral wall of the nozzle at the nozzle outlet, the deflector having a curved section extending between a proximal end at the nozzle outlet and a distal end, the deflector intersected by the central axis of the nozzle.

The aircraft engine may include any of the following features, in any combinations.

In some embodiments, a shape of the flow passage at the nozzle outlet is elongated.

In some embodiments, the peripheral wall of the nozzle at the nozzle outlet includes wall sections circumferentially distributed around the flow passage, the wall sections including a first wall section and a second wall section extending transversally to the first wall section, the first wall section longer than the second wall section, the deflector secured to the first wall section.

In some embodiments, the curved section extends from the proximal end to the distal end of the deflector.

In some embodiments, the proximal end and the distal end are at a same elevation from a surface of the oil in the reservoir.

In some embodiments, the deflector defines an open channel delimited by a central web, a first lip protruding transversally from the central web, and a second lip spaced apart from the first lip and protruding transversally from the central web.

In some embodiments, the second lip is located below the first lip and closer to a surface of the oil in the reservoir, the second lip recessing towards the central web and towards an end of the deflector.

In some embodiments, the deflector is devoid of aperture.

In some embodiments, the deflector defines ribs extending longitudinally along a direction of the flow of the oil.

In some embodiments, the curved section defines an angle of at least about 60 degrees and at most 90 degrees.

In some embodiments, a ratio of the flow circulating area of the flow passage at the nozzle outlet to the flow circulating area of the flow passage at the nozzle inlet is about 0.95.

In another aspect, there is provided a de-aerator for an aircraft engine, comprising: an inlet for receiving a flow of oil and an outlet for outputting the flow of oil; a nozzle downstream of the inlet and defining a flow passage delimited by a peripheral wall, a flow circulating area of the flow passage decreasing in a direction of the flow of the oil, the peripheral wall, at a nozzle outlet of the nozzle, having a first side and a second side opposite the first side; and a deflector downstream of the nozzle, the deflector protruding substantially tangentially from the first side of the peripheral wall of the nozzle, the deflector having a curved section for changing a direction of the flow of oil, the deflector extending from the first side of the peripheral wall and curving towards the second side of the peripheral wall.

The de-aerator may include any of the following features, in any combinations.

In some embodiments, the de-aerator is free of moving part.

In some embodiments, a shape of the flow passage at an intersection between the nozzle and the deflector is elongated.

In some embodiments, the peripheral wall of the nozzle at the intersection includes wall sections conjointly defining the first side and the second side of the peripheral wall, the wall sections circumferentially distributed around the flow passage, the wall sections including a first wall section and a second wall section extending transversally to the first wall section, the first wall section longer than the second wall section, the deflector secured to the first wall section.

In some embodiments, the deflector defines an open channel delimited by a central web, a first lip protruding from the central web, and a second lip spaced apart from the first lip and protruding from the central web.

In some embodiments, the second lip merges into the central web towards an end of the deflector.

In some embodiments, the deflector is devoid of aperture.

In some embodiments, the curved section defines an angle of at least about 60 degrees and at most 90 degrees.

In some embodiments, the flow circulating area decreases by about 5% along the nozzle.

BRIEF DESCRIPTION OF THE DRAWINGS

Reference is now made to the accompanying figures in which.

DETAILED DESCRIPTION

Figure 1:
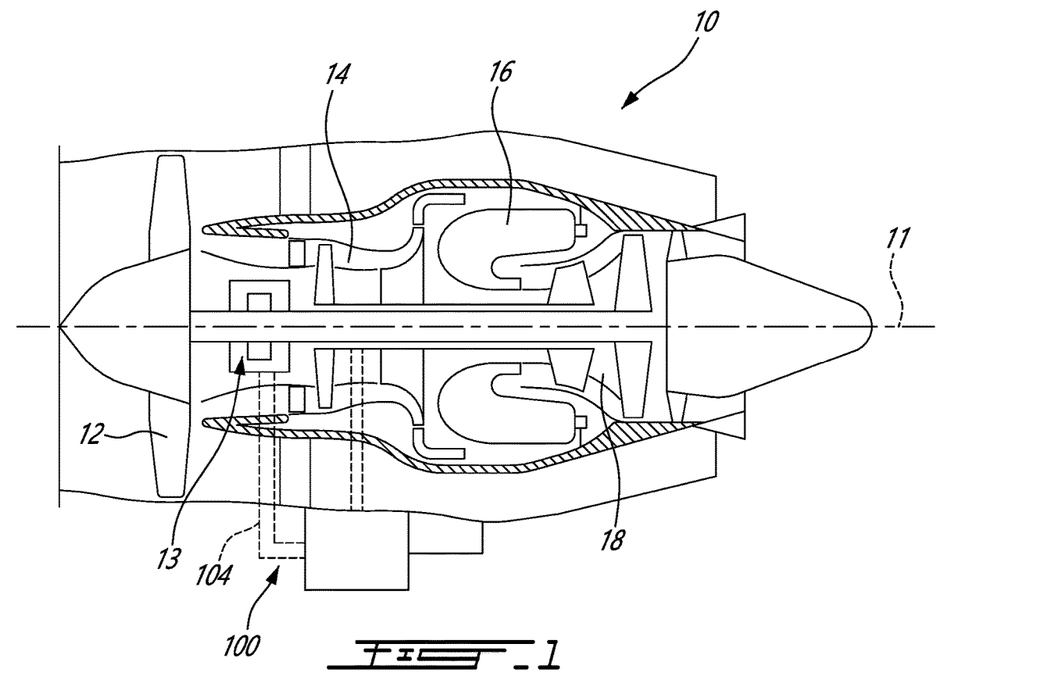
FIG. 1 is a schematic cross sectional view of an aircraft engine provided in the form of a gas turbine engine.

FIG. 1 illustrates an aircraft engine, such as a gas turbine engine 10, of a type preferably provided for use in subsonic flight. The gas turbine engine 10 includes in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10.

It will be appreciated that the principle of the present disclosure may be applied to any aircraft engines including a lubrication system or a cooling system, such as turbofan, turboprop, turboshaft, internal combustion engines, and so on.

Figure 2:
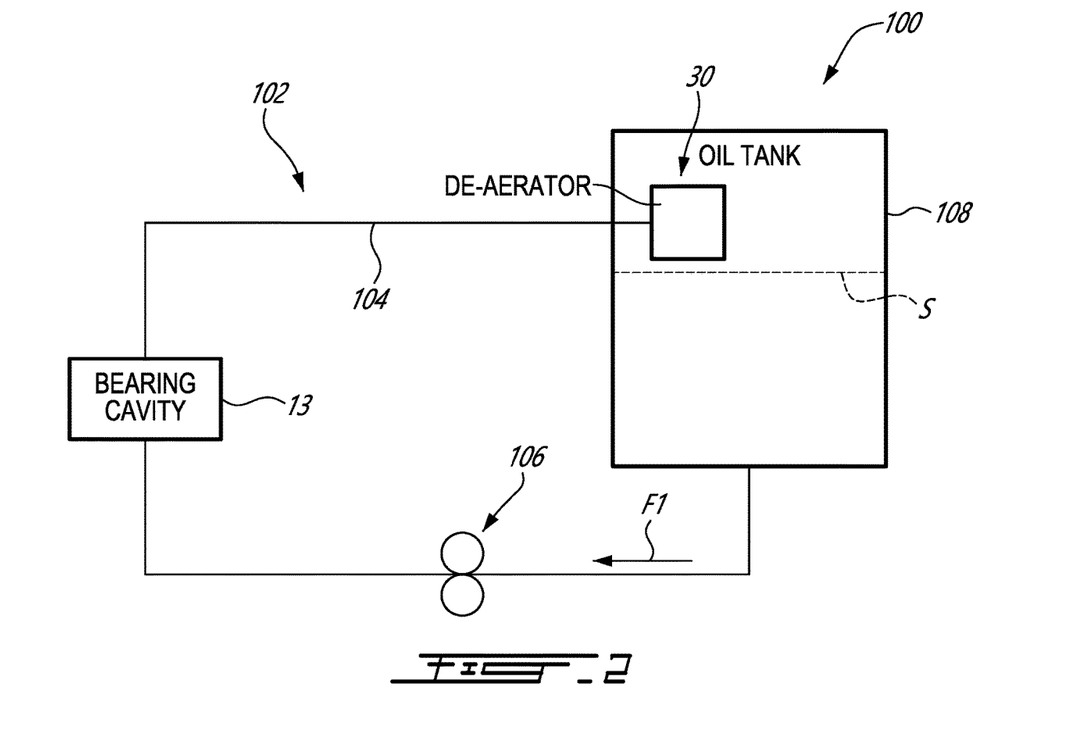
FIG. 2 is a schematic view of an oil system in accordance with one embodiment for the aircraft engine of FIG. 1.

Referring to FIGS. 1 and 2, the gas turbine engine 10 includes an oil system 100 for lubricating and/or cooling components in need of lubrication and/or cooling. These components may include, for instance, a bearing cavity 13 of the gas turbine engine 10, gearboxes, and so on. The bearing cavity 13 may include a plurality of bearing cavities for the different bearings of the gas turbine engine 10. The bearing cavity 13 is an enclosure surrounding a shaft (e.g., high-pressure shaft, low-pressure shaft) of the gas turbine engine 10 and containing one or more bearing(s). The bearing cavity 13 is supplied with a flow of oil F1 during operation to maintain proper lubricating conditions for the bearings. Used oil is scavenged out of the bearing cavity 13 and returned back to a reservoir.

In the embodiment shown, the oil system 100 includes an oil circuit 102 including conduits 104 for flowing the oil. A pump 106 is used for driving the flow of the oil F1 in the oil circuit 102. The oil system 100 includes an oil reservoir 108 that contains a volume of the oil. The oil system 100 is operable to draw oil from the oil reservoir 108 and to flow this oil within the conduits 104 to distribute the oil into the different components requiring oil. Oil is scavenged and flown back to the oil reservoir 108. The oil system 100 may also include additional components such as valve(s), heat exchangers, filters, scavenged pump(s), etc.

In some cases, the oil flows through the bearing cavity 13 and is mixed with compressed air injected therein for pressurizing the bearing cavity 13. The oil mixture exiting the bearing cavity 13 may thus have a greater air content than the oil mixture entering the bearing cavity 13. Therefore, the oil system 100 includes a de-aerator 30 to remove at least a portion of the air contained within the air-oil mixture it receives before flowing the oil back to the one or more components in need of lubrication. The disclosed de-aerator 30 is a passive device in that it is free of any moving parts. The de-aerator 30 hence does not rely centrifugal force exerted by a rotating part for separating the air form the air-oil mixture.

Figure 3:
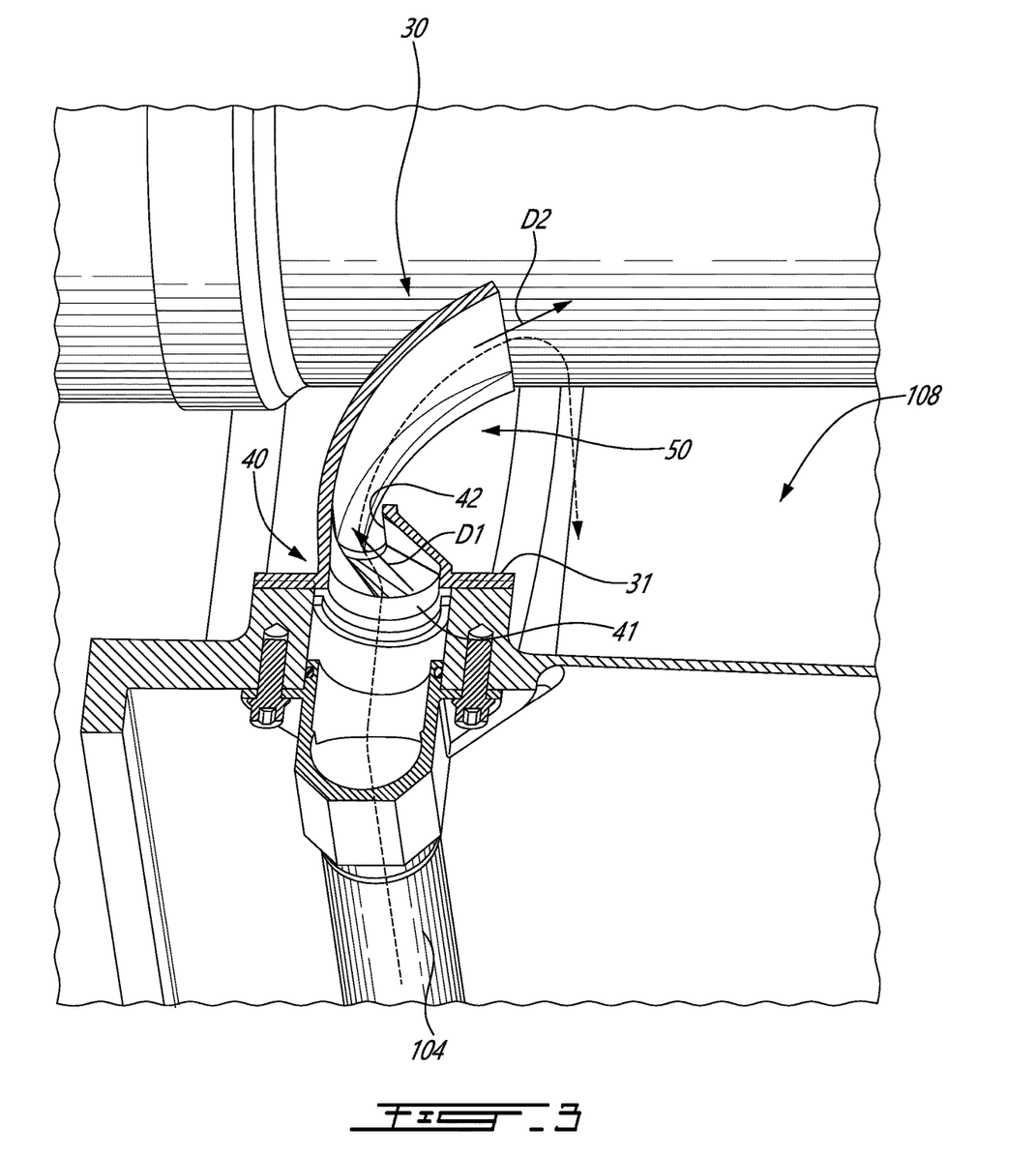
FIG. 3 is a three dimensional cutaway view of a de-aerator in accordance with one embodiment with an oil reservoir of the oil system of FIG. 2.
Figure 4:
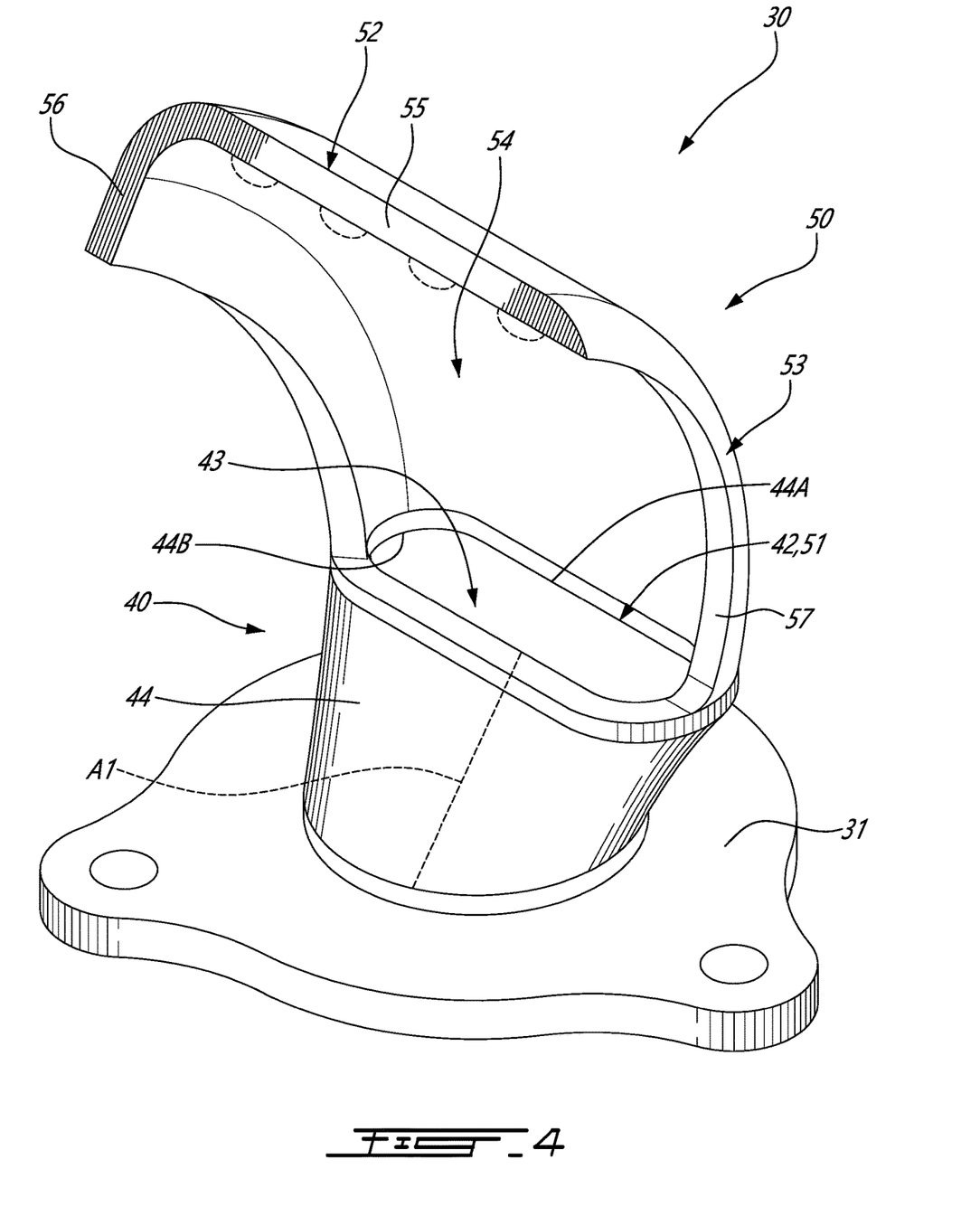
FIG. 4 is a three dimensional view of the de-aerator of FIG. 3.
Figure 5:
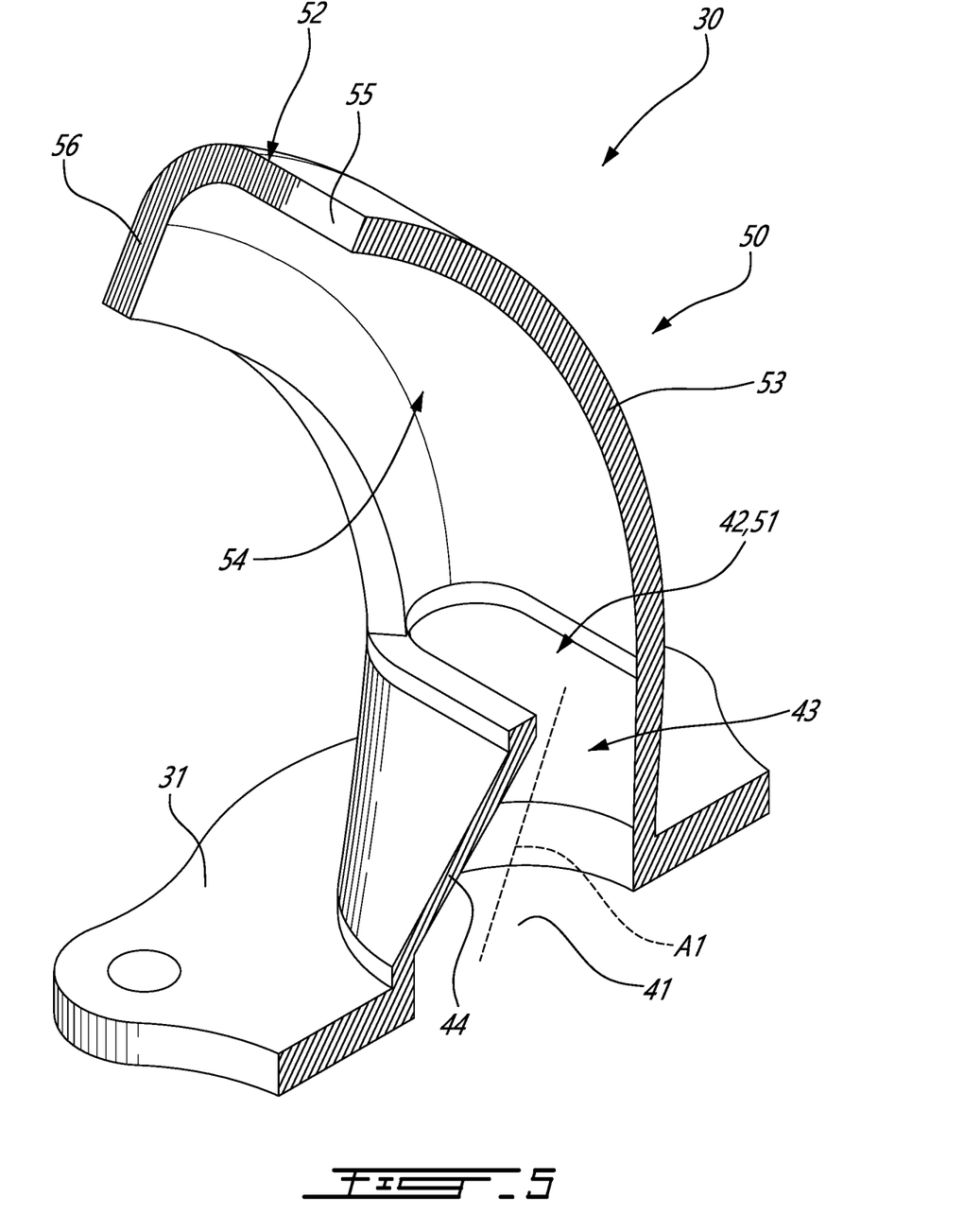
FIG. 5 is a three dimensional cutaway view of the de-aerator of FIG. 3.

Referring now to FIGS. 3-5, the de-aerator 30 is described in greater detail. The de-aerator 30 is a passive device in that it is devoid of any moving parts. Inventors of the present disclosure observed that when the air-oil mixture is injected back into the oil reservoir 108 it impacts a surface S (FIG. 2) of the oil in the oil reservoir 108 and entrains air with it air. This creates foaming which increases dwell time in the oil reservoir 108. This may further increase a volume of oil required for proper operation. The de-aerator 30 of the present disclosure is used for separating the air from the oil when the oil is returned into the oil reservoir 108. Features of the de-aerator 30 may allow the air to exit from its center while the oil follows/sticks to a wall and loose its energy before failing into the oil reservoir 108. The de-aerator 30 may be installed within the oil reservoir 108 such that its outlet injects the oil in a volume of air located in the oil reservoir 108 and above the surface S of the oil.

The de-aerator 30 includes a nozzle 40 and a deflector 50. The deflector 50 is located downstream of the nozzle 40 relative to a flow of oil through the de-aerator 30. The de-aerator 30 may include a flange 31 used for securing the de-aerator 30 to a structure of the gas turbine engine 10. For instance, as shown in FIG. 3, the flange 31 is fastened to a side wall of the oil reservoir 108.

The nozzle 40 extends from a nozzle inlet 41 to a nozzle outlet 42 downstream of the nozzle inlet 41. The nozzle 40 defines a flow passage 43 extending from the nozzle inlet 41 to the nozzle outlet 42. The flow passage 43 extends along a flow axis A1 from the nozzle inlet 41 to the nozzle outlet 42. The flow axis A1 corresponds to a central axis of the nozzle 40. The nozzle 40 may define a plurality of cross-sections distributed axially along the central axis. The central axis of the nozzle 40 may be defined by a line interconnecting the geometric centers of each of those cross-sections. The flow passage 43 defines a flow circulating area taken on a plane normal to the flow axis A1. The flow circulating area of the flow passage 43 decreases along a direction of the flow through the nozzle 40. In this embodiment, the flow circulating area of the flow passage 43 at the nozzle outlet 42 is less than the flow circulating area of the flow passage 43 at the nozzle inlet 41. In the present embodiment, a ratio of the flow circulating area at the nozzle outlet 42 to the flow circulating area at the nozzle inlet 41 is about 0.95. Put differently, the flow circulating area may decrease by about 5% along the nozzle 40. The ratio may be about 0.98 and as high as 0.99 in some embodiments. Herein, the expression "about" implies variations of plus or minus 10%. The decrease of the flow circulating area of the flow passage 43 is used to avoid a back flow in the nozzle 40 while minimizing a velocity increase of the oil through the nozzle 40.

As shown in FIGS. 4-5, the nozzle 40 has a peripheral wall 44 that extends around the flow axis A1 and the central axis and around the flow passage 43. The peripheral wall 44 therefore defines a boundary of the flow passage 43. In the embodiment shown, the peripheral wall 44 of the nozzle 40 at the nozzle outlet 42, defines an elongated shape (e.g., oblong, ellipse, oval, etc). More specifically, the peripheral wall 44 may include interconnected wall sections circumferentially distributed around the flow axis A1. More specifically, the flow passage 43 transitions from a circular shape at the nozzle inlet 41 to an elongated shape at the nozzle outlet 42. Alternatively, the flow passage 43 may have an elongated cross-sectional shape from the nozzle inlet 41 to the nozzle outlet 42. The wall sections may include, for instance, first wall sections 44A and second wall sections 44B. The first and second wall sections 44A, 44B conjointly define the first side and the second side of the peripheral wall 44 of the nozzle 40. The first wall sections 44A face one another and the second wall sections 44B face one another. At the nozzle inlet 41, the first wall sections 44A and the second wall sections 44B define a circular shape of the flow passage 43 and they may all of the same length (e.g., arcuate length). At the nozzle outlet 42, the first wall sections 44A and the second wall sections 44B may have different lengths. As shown in FIG. 4, at the nozzle outlet 42, a length of the first wall sections 44A is greater than a length of the second wall sections 44B to create the elongated or oblong shape.

In the embodiment shown, at the nozzle outlet 42, the first wall sections 44A are straight whereas the second wall sections 44B are curved. The nozzle 40 therefore changes a shape of the flow circulating area from being substantially circular at the nozzle inlet 41 to being substantially oblong at the nozzle outlet 42. The oblong or elongated shape at the nozzle outlet 42 is used to increase a contact area between the air-oil mixture and the deflector 50 as will be discussed further below.

As depicted in FIG. 5, a first one of the first wall sections 44A protrude substantially perpendicularly from the flange 31 whereas a second one of the first wall sections 44A opposite the first one of the first wall sections 44A extends at an angle towards the first one of the first wall sections 44A from the nozzle inlet 41 to the nozzle outlet 42. Put differently, the two first wall sections 44A extend towards one another from the nozzle inlet 41 to the nozzle outlet 42. This angle between the two first wall sections 44A may guide the air-oil mixture towards the first one of the first wall sections 44A. In the embodiment shown, the deflector 50 extends from one of the first wall sections 44A of the peripheral wall 44 and curves towards the other of the first wall sections 44A. The deflector 50 may overlap the other of the first wall sections 44A. The distal end 52 of the deflector 50 may be located past the other of the first wall sections 44A.

Referring again to FIGS. 4-5, the deflector 50 is described in greater detail. The deflector 50 protrudes tangentially from the peripheral wall 44 of the nozzle 40 at the nozzle outlet 42. Stated differently, the deflector 50 is contiguous with the peripheral wall 44 of the nozzle 40 to form a continuous surface from the nozzle 40 to the deflector 50. More specifically, the deflector 50 protrudes tangentially from the first one of the first wall sections 44A of the peripheral wall 44. The deflector 50 extends from a proximal end 51 at the nozzle outlet 42 to a distal end 52 where the oil leaves the deflector 50 to reach the oil in the oil reservoir 108.

The deflector 50 has a curved section 53 between the proximal end 51 and the distal end 52. The curved section 53 may define an angle of at least about 60 degrees and at most 90 degrees. In the depicted embodiment, the curved section 53 extends an entire length of the deflector 50 from the proximal end 51 to the distal end 52. The deflector 50 defines an open passage 54 from the proximal end 51 to the distal end 52. In other words, the oil flowing along the deflector 50 is exposed to an environment outside the de-aerator 30. The open passage 54 defined by the deflector 50 is therefore not fully encased by a wall. The open passage 54 is therefore partially exposed to the environment since one or more sides of the open passage 54 are left uncovered to allow exposure to the environment. Hence, the deflector 50 defines an open channel for the oil. In this case, the environment outside the de-aerator 30 corresponds to a volume of air in the oil reservoir 108.

In the depicted embodiment, the deflector 50 includes a central web 55, a top lip 56 protruding transversally from the central web 55, and a bottom lip 57 spaced apart from the top lip 56 and protruding transversally from the central web 55. The open passage 54 is therefore conjointly defined by the top lip 56, the bottom lip 57, and the central web 55. The deflector 50 is thus free of any wall interconnecting free ends of the top lip 56 and the bottom lip 57. In the present embodiment, the deflector 50, or at least the central web 55, are devoid or free of aperture extending therethrough. The central web 55 may be provided with ribs (shown in dashed lines in FIG. 4) extending substantially parallel to a direction of the flow to increase a friction force between the air-oil mixture and the deflector 50. This increase in friction is created by an increase of a surface contact area between the air-oil mixture and the deflector 50. The top lip 56 and the bottom lip 57 act as guard rails preventing the oil from flowing over the central web 55.

As shown more clearly in FIG. 3, the proximal end 51 and the distal end 52 of the deflector 50 are located substantially at a same elevation (e.g., height) from a surface of the oil in the oil reservoir 108. Hence, the bottom lip 57 is located below the top lip 56 and closer to the surface of the oil. However, other configurations are contemplated. For instance, the deflector 50 may curve towards the oil in the oil reservoir 108 from the proximal end 51 to the distal end 52. A height of the bottom lip 57 may decrease towards the distal end 52 of the deflector 50. In other words, the bottom lip 57 may gradually recess towards the central web 55 from the proximal end 51 to the distal end 52. The bottom lip 57 may merge into the central web 55 towards the distal end 52 of the deflector 50. The bottom lip 57 may be absent at the distal end 52 of the deflector 50 to allow the oil to leave the deflector 50 and fall into the oil in the oil reservoir 108.

In use, the flow of the air-oil mixture received in the de-aerator 30 via the nozzle inlet 41 is widened or enlarged towards the nozzle outlet 42 where it tangentially meets the deflector 50. The mixture then flows along the deflector 50 and a direction of the mixture is changed by the curved section 53 of the deflector 50. In the embodiment shown, the deflector 50 extends along a direction such as to at least partially overlap the nozzle outlet 42. In other words, the peripheral wall 44 of the nozzle 40, at the nozzle outlet 42, has first and second sides opposite one another. The deflector 50 extends from the first side of the peripheral wall 44 and curves towards the second side of the peripheral wall 44. Put differently, the deflector 50, and more specifically the central web 55 of the deflector 50, is intersected by the central axis of the nozzle 44. The mixture flows along the central web 55 of the deflector 50 and a velocity of the mixture is decreased because of the friction between the oil and the central web 55. This decrease in velocity allows at least a portion of the air contained in the air-oil mixture to be expelled therefrom. The oil then reaches the distal end 52 of the deflector 50 where it is released and fall along a parabolic trajectory towards the oil in the oil reservoir 108 while minimizing air bubble creation.

More specifically, the air-oil mixture changes direction from the nozzle inlet 41 of the nozzle 40 to the distal end 52 of the deflector 50. As shown in FIG. 3, the air-oil mixture flows along a first direction D1 from the nozzle inlet 41 to the nozzle outlet 42 and then changes direction along the deflector 50 and leaves the deflector 50 along a second direction D2. The direction of the flow may gradually change from the first direction D1 to the second direction D2 along the deflector 50 from the nozzle outlet 42 to the distal end 52 of the deflector 50. The expression "gradually" implies that the change of direction is substantially smooth and substantially devoid of any sharp changes. The first direction D1 and the second direction D2 are partially opposite to one another. More specifically, the first and second directions D1, D2 may share a common orientation but have opposing components. For instance, the first and second directions D1, D2 may each have components along a primary axis (e.g., X-axis) and along a secondary axis (e.g., Y-axis) being normal to the primary axis. The first and second directions D1, D2 both have components along the primary axis with the same orientation (e.g., away from the nozzle inlet 41), and have components along the secondary axis and said components along the secondary axis have opposite orientations (e.g., first direction D1 is oriented towards the left in FIG. 3 whereas the second direction D2 is oriented towards the right in FIG. 3).

This change of direction imparted by the nozzle 40 and the deflector 50 may cause the air in the air-oil mixture to at least partially escape from the oil of the air-oil mixture. This separation may be caused by a difference in inertia of the oil and of the air as the mixture flows along the de-aerator 30.

The de-aerator 30 of the present disclosure may therefore efficiently separate the air from the oil without the use of any moving part. The oil that exits the de-aerator 30 may therefore have an air content less than that of the air-oil mixture that enters the de-aerator 30. The oil exiting the de-aerator 30 may then fall into the volume of oil contained in the oil reservoir 108 while minimizing foaming.

In the context of the present disclosure, the expression "substantially" is meant to encompass slight variations that may be caused by manufacturing processes, manufacturing tolerances, and so on. For instance, "substantially perpendicular" implies slight variations of plus or minus 5 degrees.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
   an oil circuit fluidly connecting a reservoir of oil to components of the aircraft engine; and
   a de-aerator fluidly connected to the oil circuit and located downstream of the components relative to a flow of the oil through the oil circuit, the de-aerator feeding the flow of the oil into the reservoir, the de-aerator having:
      a nozzle extending from a nozzle inlet to a nozzle outlet along a flow passage delimited by a peripheral wall, the peripheral wall extending around a central axis of the nozzle, a flow circulating area of the flow passage decreasing from the nozzle inlet to the nozzle outlet; and
      a deflector projecting from the peripheral wall of the nozzle at the nozzle outlet, the deflector having a curved section extending between a proximal end at the nozzle outlet and a distal end, the deflector intersected by the central axis of the nozzle.

2. The aircraft engine of claim 1, wherein a shape of the flow passage at the nozzle outlet is elongated.

3. The aircraft engine of claim 2, wherein the peripheral wall of the nozzle at the nozzle outlet includes wall sections circumferentially distributed around the flow passage, the wall sections including a first wall section and a second wall section extending transversally to the first wall section, the first wall section longer than the second wall section, the deflector secured to the first wall section.

4. The aircraft engine of claim 1, wherein the curved section extends from the proximal end to the distal end of the deflector.

5. The aircraft engine of claim 1, wherein the proximal end and the distal end are at a same elevation from a surface of the oil in the reservoir.

6. The aircraft engine of claim 1, wherein the deflector defines an open channel delimited by a central web, a first lip protruding transversally from the central web, and a second lip spaced apart from the first lip and protruding transversally from the central web.

7. The aircraft engine of claim 6, wherein the second lip is located below the first lip and closer to a surface of the oil in the reservoir, the second lip recessing towards the central web and towards an end of the deflector.

8. The aircraft engine of claim 1, wherein the deflector is devoid of aperture.

9. The aircraft engine of claim 1, wherein the deflector defines ribs extending longitudinally along a direction of the flow of the oil.

10. The aircraft engine of claim 1, wherein the curved section defines an angle of at least about 60 degrees and at most 90 degrees.

11. The aircraft engine of claim 1, wherein a ratio of the flow circulating area of the flow passage at the nozzle outlet to the flow circulating area of the flow passage at the nozzle inlet is about 0.95.

12. A de-aerator for an aircraft engine, comprising:
an inlet for receiving a flow of oil and an outlet for outputting the flow of oil;
a nozzle downstream of the inlet and defining a flow passage delimited by a peripheral wall, a flow circulating area of the flow passage decreasing in a direction of the flow of the oil, the peripheral wall, at a nozzle outlet of the nozzle, having a first side and a second side opposite the first side; and
a deflector downstream of the nozzle, the deflector protruding substantially tangentially from the first side of the peripheral wall of the nozzle, the deflector having a curved section for changing a direction of the flow of oil, the deflector extending from the first side of the peripheral wall and curving towards the second side of the peripheral wall.

13. The de-aerator of claim 12, wherein the de-aerator is free of moving part.

14. The de-aerator of claim 12, wherein a shape of the flow passage at an intersection between the nozzle and the deflector is elongated.

15. The de-aerator of claim 14, wherein the peripheral wall of the nozzle at the intersection includes wall sections conjointly defining the first side and the second side of the peripheral wall, the wall sections circumferentially distributed around the flow passage, the wall sections including a first wall section and a second wall section extending transversally to the first wall section, the first wall section longer than the second wall section, the deflector secured to the first wall section.

16. The de-aerator of claim 12, wherein the deflector defines an open channel delimited by a central web, a first lip protruding from the central web, and a second lip spaced apart from the first lip and protruding from the central web.

17. The de-aerator of claim 16, wherein the second lip merges into the central web towards an end of the deflector.

18. The de-aerator of claim 12, wherein the deflector is devoid of aperture.

19. The de-aerator of claim 12, wherein the curved section defines an angle of at least about 60 degrees and at most 90 degrees.

20. The de-aerator of claim 12, wherein the flow circulating area decreases by about 5% along the nozzle.

* * * * *